US008100101B2

(12) United States Patent
Makita

(10) Patent No.: US 8,100,101 B2
(45) Date of Patent: Jan. 24, 2012

(54) FUEL SUPPLY PUMP

(75) Inventor: Yoshikazu Makita, Anjo (JP)

(73) Assignee: Denso Corporation, Kariya (JP)

( * ) Notice: Subject to any disclaimer, the term of this patent is extended or adjusted under 35 U.S.C. 154(b) by 212 days.

(21) Appl. No.: 12/512,215

(22) Filed: Jul. 30, 2009

(65) Prior Publication Data

US 2010/0024779 A1 Feb. 4, 2010

(30) Foreign Application Priority Data

Aug. 1, 2008 (JP) ................................ 2008-200056

(51) Int. Cl.
*F01L 1/14* (2006.01)
*F16H 53/06* (2006.01)

(52) U.S. Cl. ....................................... 123/90.48; 74/569

(58) Field of Classification Search ............... 123/90.48, 123/90.49, 90.5, 90.51; 74/569, 570.3
See application file for complete search history.

(56) References Cited

U.S. PATENT DOCUMENTS

| | | | | | |
|---|---|---|---|---|---|
| 4,747,376 | A | * | 5/1988 | Speil et al. | 123/90.55 |
| 5,099,807 | A | * | 3/1992 | Devine | 123/90.48 |
| 5,188,068 | A | * | 2/1993 | Gaterman et al. | 123/90.35 |
| 5,273,005 | A | * | 12/1993 | Philo et al. | 123/90.5 |
| 5,603,303 | A | | 2/1997 | Okajima et al. | |
| 5,931,133 | A | * | 8/1999 | Giannone et al. | 123/90.5 |
| 6,216,583 | B1 | * | 4/2001 | Klinger et al. | 92/129 |
| 6,405,698 | B1 | * | 6/2002 | Steinmetz | 123/90.48 |
| 7,497,157 | B2 | * | 3/2009 | Aoki et al. | 92/129 |
| 7,513,756 | B2 | | 4/2009 | Aoki et al. | |
| 7,568,461 | B1 | * | 8/2009 | Straub | 123/90.48 |
| 2005/0106035 | A1 | | 5/2005 | Aoki et al. | |
| 2010/0037865 | A1 | * | 2/2010 | Fuchs | 123/508 |

FOREIGN PATENT DOCUMENTS

| | | |
|---|---|---|
| JP | 2004-324535 | 11/2004 |
| JP | 2004-324546 | 11/2004 |
| JP | 2007-303430 | 11/2007 |

OTHER PUBLICATIONS

Japanese Office Action dated Apr. 20, 2010, issued in corresponding Japanese Application No. 2008-200056, with English translation.

* cited by examiner

*Primary Examiner* — Thomas Moulis
(74) *Attorney, Agent, or Firm* — Nixon & Vanderhye PC

(57) ABSTRACT

A fuel supply pump includes a housing, a shaft in a case, a cam in the case formed eccentrically with respect to the shaft to rotate with the shaft, a tappet on an outer circumferential side of the cam movable in a vertical direction, and a plunger reciprocating with the tappet to pressurize fuel in a chamber. The tappet includes a roller and a supporting member rotatably supporting the roller in its thrust direction. The roller slidingly contacts outer circumference of the cam. The member includes an end face supporting the plunger, a surface at its end on an opposite side from the face and slidingly contacting outer circumference of the roller, and an inner wall supporting the roller in the thrust direction. The roller includes a middle section slidingly contacting the surface along its longitudinal direction, and a contact part at both ends of the section contacting the wall.

2 Claims, 5 Drawing Sheets

FUEL SUPPLY PUMP

CROSS REFERENCE TO RELATED APPLICATION

This application is based on and incorporates herein by reference Japanese Patent Application No. 2008-200056 filed on Aug. 1, 2008.

BACKGROUND OF THE INVENTION

1. Field of the Invention

The present invention relates to a fuel supply pump, and is suitable for application to, for example, a fuel supply pump, which pressure-feeds fuel under pressure equivalent to a fuel injection pressure in a fuel injection system of a diesel engine.

2. Description of Related Art

Conventionally, a pump which includes a cam that rotates upon application of driving force of an engine or the like, a plunger that reciprocates inside a pressurizing chamber, and a tappet that is provided between the cam and the plunger to convert rotary motion of the cam into rectilinear motion of the plunger, and which pressurizes fuel suctioned into the pressurizing chamber by the plunger that reciprocates as a result of the rotation of the cam, is known as a fuel supply pump (see, for example, JP-A-08-14140 corresponding to U.S. Pat. No. 5,603,303).

As a type of such a fuel supply pump, a device disclosed in JP-A-08-14140 includes a roller that rotates along a profile surface of a cam, a roller pin that rotatably supports a shaft of the roller from an inner side, and a tappet body having a supporting wall which has a cylindrical shape and supports both axial end parts of the roller pin, as components of a tappet. According to this technology, because the roller which is supported by the tappet body via the roller pin rotatably and slidingly contacts the cam, the roller mitigates sliding resistance of the cam and the tappet to enable smooth rotation-rectilinear motion conversion.

In a fuel supply pump as disclosed in JP-A-08-14140 above, which makes the tappet and plunger rectilinearly move as a result of the rotation of the cam and then pressure-feeds fuel in the pressurizing chamber by the plunger, when fuel is pressurized under pressure equivalent to injection pressure by pressure-feed movement of the plunger, reaction force caused by the fuel pressure is applied to the tappet, which supports the plunger, and the cam. In the tappet, which supports the roller via the roller pin against this reaction force, the reaction force applied to the roller and the tappet body needs to be supported by the axial end parts and the supporting wall of the roller pin.

However, according to the conventional technology of JP-A-08-14140, a pressure receiving width of the axial end parts and the supporting wall to which the above-described reaction force is applied is structurally limited to the supporting wall that is a side wall of the tappet body, which accommodates the roller, except the roller. In the conventional technology having such a structure, when the above injection pressure is more highly pressurized, a face pressure at the axial end parts of the roller pin exceeds a face pressure acceptable value, so that there is concern that damage such as seizure may be caused to the axial end parts.

Measures against the above concern may be that a pressure receiving area is increased so as to reduce the face pressure. However, a diameter of the roller pin is increased to a roller diameter or less, and even if the diameter of the roller pin is increased to the roller diameter, there is a limit to the increase in the pressure receiving area as a result of the product of the diameter of the roller pin and the pressure receiving width. In expanding the pressure receiving width, for example, because the tappet is upsized, there is concern that costs of the fuel supply pump may increase or installability of the pump in an engine may be limited.

Accordingly, the inventor considers directly supporting a roller by the above-described cylindrical tappet body. The following problems have been found out after the inventor conducts research in earnest. That is, it has been found that, although face pressure is reduced since an outer circumferential surface of a columnar roller is in sliding contact with a sliding contact surface of a tappet body, a corner portion of axial end part of the roller and a side wall of the cylindrical tappet body may be brought into contact with each other, thereby causing seizure. This is because at both axial end parts of the roller, a peripheral speed at the corner portion increases in accordance with the diameter expansion of the corner portion of the axial end part and furthermore, because contact pressure becomes high because of the contact of the corner portion with the side wall in a manner of line contact. Moreover, by reason of, for example, variation in alignment between the roller and the cam, force in a direction perpendicular to a direction of rectilinear motion of the tappet, i.e., in a thrust direction of the roller, is sometimes applied to the roller, so that there is concern that the above-described possibility may increase.

SUMMARY OF THE INVENTION

The present invention addresses the above disadvantages. Thus, it is an objective of the present invention to provide a fuel supply pump which achieves a good balance between reduction in face pressure as a countermeasure against high pressurization of injection pressure and prevention of seizure at an end portion and end face of a roller even if acting force which is different from a direction of linear motion is applied to the roller.

To achieve the objective of the present invention, there is provided a fuel supply pump for supplying high-pressure fuel to an internal combustion engine. The pump includes a housing, a drive shaft, a cam, a tappet, and a plunger. The housing has a cam case and a pressurizing chamber into which fuel is drawn. The drive shaft is accommodated in the cam case. The cam is disposed in the cam case and formed on the drive shaft eccentrically with respect to the drive shaft so as to rotate together with the drive shaft. The tappet is disposed on an outer circumferential side of the cam and supported by the housing so as to be movable in a direction perpendicular to the drive shaft. The plunger is configured to reciprocate together with the tappet so as to pressurize fuel in the pressurizing chamber, so that the tappet converts rotational motion of the cam into linear motion of the plunger. The tappet includes a roller and a supporting member, which rotatably supports the roller from an outside thereof and supports the roller in a thrust direction thereof. The roller is formed in a columnar shape and in sliding contact with an outer circumference of the cam. The supporting member includes an end face which supports the plunger, a sliding contact surface at an end portion of the supporting member on an opposite side from the end face in the direction perpendicular to the drive shaft and in sliding contact with an outer circumference of the roller, and an inner wall which supports the roller in the thrust direction thereof. The roller includes a middle section, and a contact part on both end sides of the middle section having a smaller diameter than the middle section. The contact part is in contact with the inner wall. The middle section is in sliding contact with the sliding contact surface along a longitudinal direction of the roller.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Embodiments of the invention are described below with reference to the accompanying drawings. By using the same numerals to indicate corresponding components in the embodiments, repeated explanations are omitted.

First Embodiment

Figure 1:
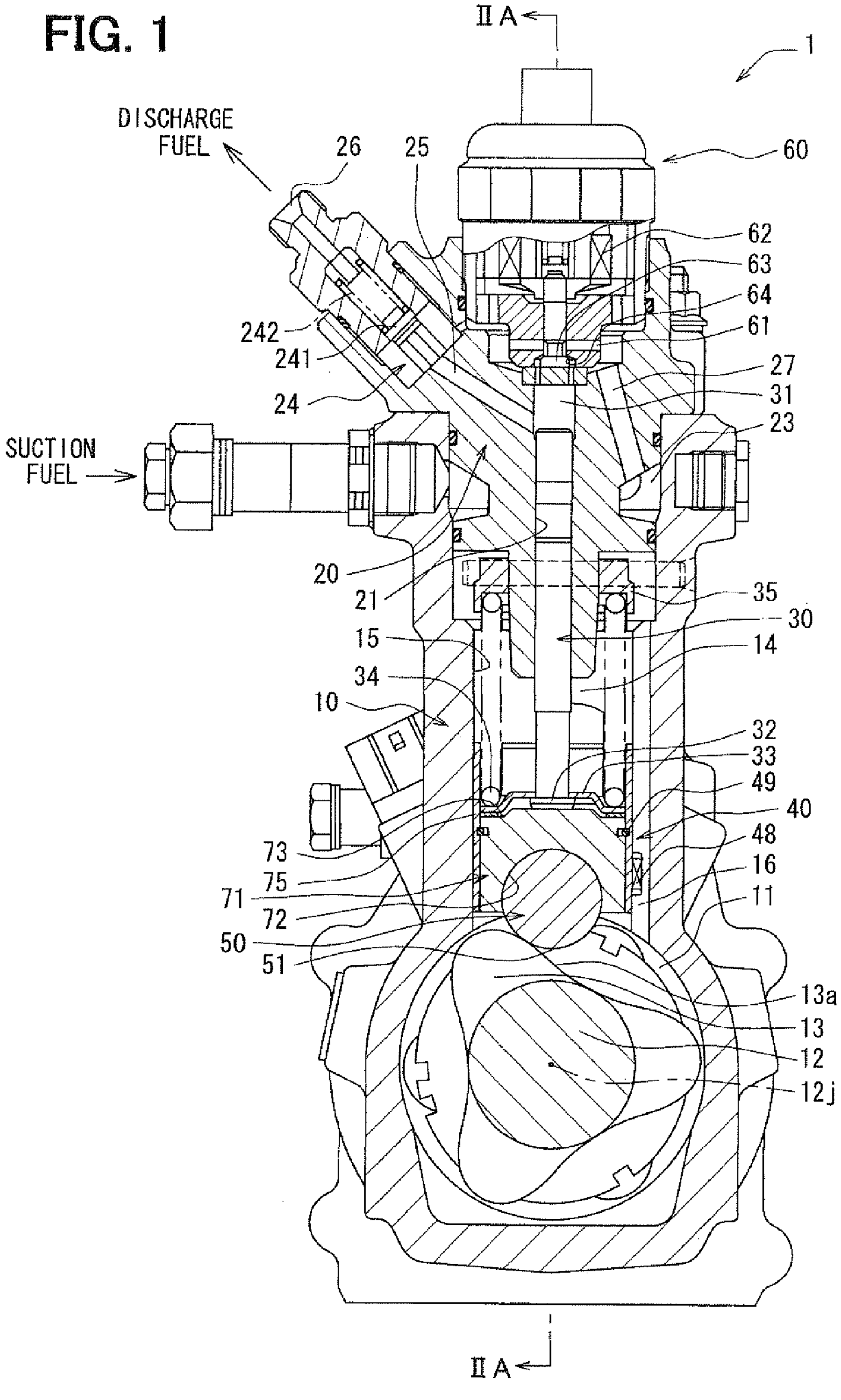
FIG. 1 is a sectional view illustrating a fuel supply pump according to a first embodiment of the invention.
Figure 2A:
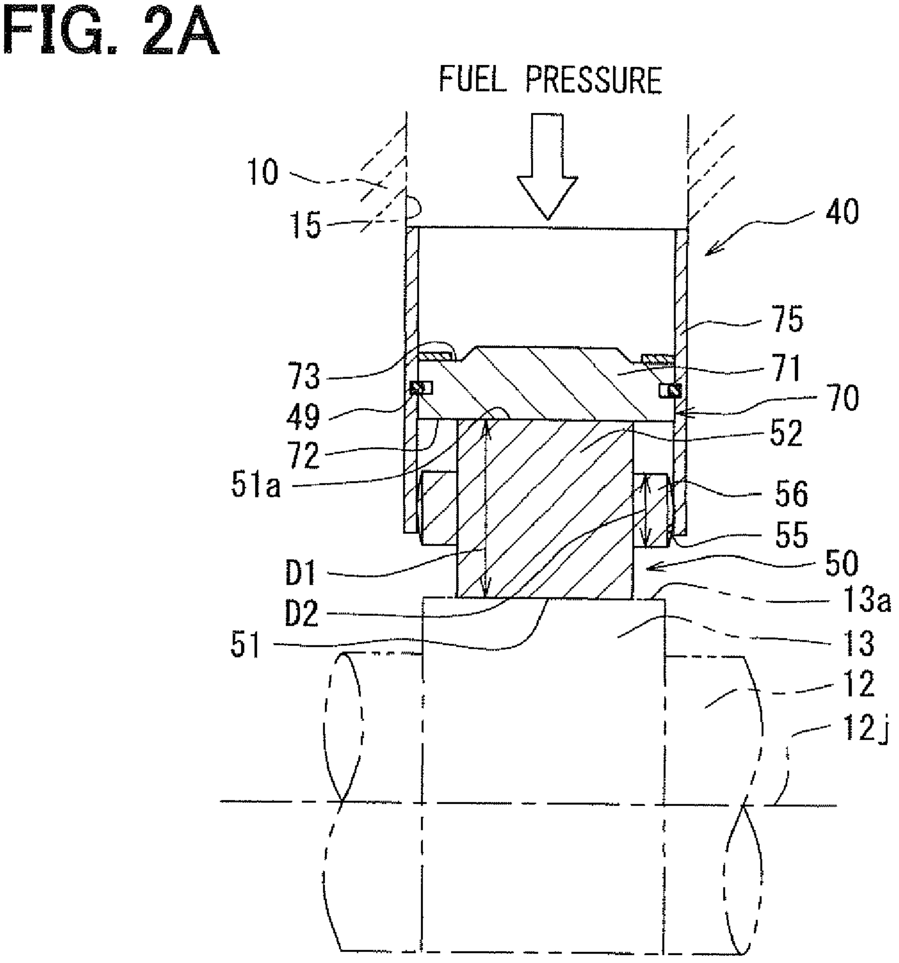
FIG. 2A is a sectional view illustrating a tappet in FIG. 1 taken along a line IIA-IIA in FIG. 1.
Figure 2B:
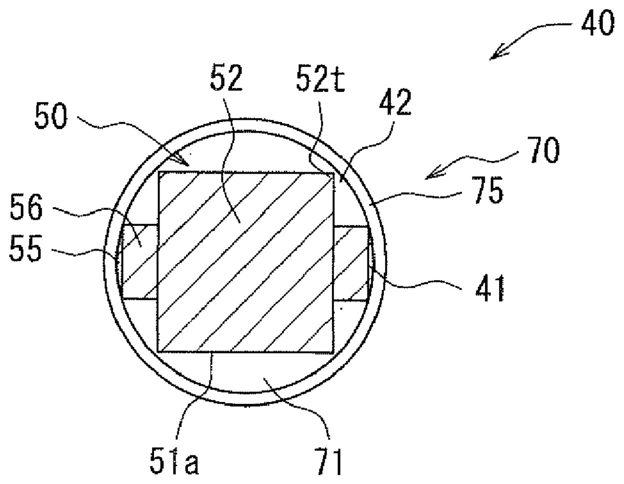
FIG. 2B is a plan view illustrating a tappet in FIG. 2A viewed from its lower side.
Figure 3:
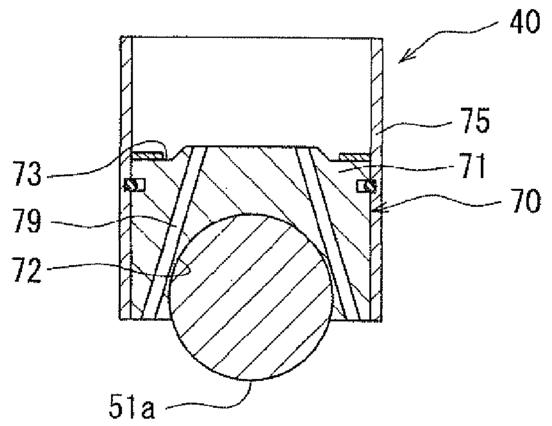
FIG. 3 is a sectional view illustrating a modification of the tappet in FIG. 1.

FIG. 1 to FIG. 3 illustrate application of a fuel supply pump according to a first embodiment of the invention to a fuel supply pump used in a common-rail type fuel injection system for a vehicle. The common-rail type fuel injection system includes mainly a fuel tank, a fuel supply pump 1, and a common rail and a fuel injection valve, which are not shown. The common-rail type fuel injection system accumulates pressure of high pressure fuel supplied through the fuel supply pump 1 in the common rail, and distributes high pressure fuel in the common rail to the fuel injection valve provided for each cylinder of an internal combustion engine, so as to inject and supply fuel into a combustion chamber of the cylinder. The fuel tank and the fuel supply pump 1 constitute a fuel supply system which supplies high pressure fuel to the common rail and the fuel injection valve.

The above described fuel tank stores fuel of normal pressure, and the fuel supply pump 1 draws fuel of normal pressure from the fuel tank and pressurizes and pressure-feeds fuel. Accordingly, the high pressure fuel supplied to the common rail is prepared.

The fuel supply pump 1 is a high pressure pump which pressure-feeds high for pressurizing fuel which has been suctioned from the fuel tank through a feed pump (not shown) as a 'low pressure pump'. As shown in FIG. 1, the fuel supply pump 1 includes a pump housing 10, and a cam case 11 is formed at one end portion of the pump housing 10. A drive shaft 12 which is driven by the engine to rotate is accommodated in the cam case 11. A cam 13 is formed on the drive shaft 12 eccentrically with respect to a shaft center 12*j* of the drive shaft 12, and the drive shaft 12 and the cam 13 are formed integrally.

A cylinder body 20 is provided in the pump housing 10 on the opposite side from the cam case in a direction perpendicular to the drive shaft 12 (vertical direction in FIG. 1), and a cylinder 21 as a 'plunger sliding hole part' is formed in the cylinder body 20. The pump housing 10 and the cylinder body 20 may correspond to a 'housing'.

A plunger 30 is supported in the cylinder 21 to slidably reciprocate in the cylinder 21 in an axial direction, which is the direction perpendicular to the drive shaft 12. A tappet chamber 14 is formed between an inner circumference side of the pump housing 10 and the cylinder body 20, and a tappet 40 is accommodated in the tappet chamber 14 to reciprocate in the chamber 14.

The plunger 30 is formed in a cylindrical shape. On a side of one end surface of the plunger 30 (upper end surface in FIG. 1), a pressurizing chamber 31, which is surrounded with one end surface of the plunger 30 and an inner circumferential surface of the cylinder 21, is formed. An annular fuel pocket part 23 to which fuel is supplied from the low pressure pump via a lead-in pipe is formed in the cylinder body 20.

The fuel pocket 23 communicates with a fuel supply passage 61 in a control valve 60 through a fuel supply passage 27. The control valve 60 is an electromagnetic valve which opens and closes communication between the pressurizing chamber 31 and the fuel pocket part 23, and includes an electromagnetic driving unit 62, and a valve member 63 which is driven by the electromagnetic driving unit 62. The valve member 63 engages a valve seat part 64, and as a result of engagement of the valve member 63 with the valve seat part 64 or disengagement of the member 63 from the seat part 64, communication between the pressurizing chamber 31 and the fuel pocket part 23 is closed or opened. In other words, a passage communicating with the pressurizing chamber 31 is opened or closed by controlling the electromagnetic driving unit 62.

The electromagnetic driving unit 62 of the control valve 60 is screwed to a position of the cylinder body 20 opposed to the upper end surface of the plunger 30. The electromagnetic driving unit 62 opens or closes communication between the fuel supply passage 61 and the pressurizing chamber 31 by driving the valve member 63. A flow of fuel discharged from the fuel supply pump 1 into the common rail is adjusted by controlling timing for energization of the electromagnetic driving unit 62.

A discharge valve 24 is disposed in the cylinder body 20, and the discharge valve 24 communicates with the pressurizing chamber 31 through a discharge hole 25. Fuel pressurized in the pressurizing chamber 31 opens a valve member 241 of the discharge valve 24 against urging force of a spring 242 and a pressure of fuel in a discharge hole 26, and the pressurized high-pressure fuel is pressure-fed to the inside of the common rail through the discharge hole 26.

A lower seat 33 is connected to an end portion 32 of the plunger 30 on the opposite side from the pressurizing chamber. The spring 34 is in contact with the lower seat 33, and the plunger 30 is pressed on the tappet 40 by urging force of the spring 34 via the lower seat 33. The other end portion of the spring 34 is in contact with an upper seat 35, so that displacement of the spring 34 toward the pressurizing chamber 31 side is limited.

The tappet 40 is formed in a generally cylindrical shape and supported in a supporting hole 15 of the pump housing 10 to be movable in the axial direction. The tappet 40 is a rotation-linear motion conversion mechanism for converting rotation into linear motion, and as a result of its one end part side being in contact with an outer circumference of the cam 13, and its other end part side supporting the end portion 32 of the plunger 30, the tappet 40 and the plunger 30 move in the axial direction in accordance with the rotation of the cam 13. A circumferential positioning part 48 which engages an axial groove 16 formed on an inner circumferential surface of the supporting hole 15 is provided for the tappet 40. As a result of displacement of the circumferential positioning part 48 in the axial groove 16 in the axial direction in accordance with the rotation of the cam 13, the circumferential positioning part 48 limits displacement of the tappet 40 in the circumferential direction. Details of the tappet 40 are described later.

The basic constitution of the fuel supply pump 1 has been described above. Next, characteristic constitution of the fuel supply pump 1 is explained below.

(Characteristic Constitution)

The tappet 40 which functions as the rotation-linear motion conversion mechanism for converting the rotation of the cam 13 into the axial movement of the plunger 30 is described below with reference to FIG. 1 to FIG. 2B. FIG. 1 is a section along a direction perpendicular to a central axis 12*j* of the drive shaft 12, and FIG. 2A illustrates a section along the central axis 12*j* of the drive shaft 12. FIG. 2B is a diagram of the arrangement of a roller 50 and a supporting member 70, which accommodates the roller 50 therein, viewed from a lower side of FIG. 2A.

As shown in FIG. 1 to FIG. 2B, the tappet 40 includes the roller 50 which slidingly contacts an outer circumference 13*a* of the cam 13, and the supporting member 70 having a sliding contact surface 72 which is in sliding contact with an outer circumference 51 of the roller 50 so as to be rotatable with respect to the cam 13.

As shown in FIG. 2A and FIG. 2B, the roller 50 is formed in a general cylindrical shape, and the roller 50 except part of the roller 50 is accommodated inside the supporting member 70. The part of the roller 50 is a portion of the roller 50 in contact with the cam.

The roller 50 includes a middle section 52 except both end sides of the roller 50 in its longitudinal direction, and a contact part 55 on the both end sides. In the first embodiment, the middle section 52 and the contact part 55 have a stepped cylindrical shape.

The middle section 52 is in sliding contact directly with the sliding contact surface 72 of the supporting member 70, and a shaft of an outer circumferential surface 51*a* of the middle section 52 is supported rotatably with respect to the sliding contact surface 72.

The contact part 55 has a smaller diameter than the middle section, and is disposed with a predetermined gap (hereinafter referred to as a first thrust gap) 41 left in a thrust direction of the roller 50 with respect to an inner wall of the supporting member 70. In other words, the contact part 55 is arranged so as to be in contact with the inner wall of the supporting member 70 in a smaller diameter range than the middle section 52. The inner wall of the supporting member 70 is a supporting wall part 75 of the supporting member 70 having a cylindrical shape.

Corner parts 52*t* at both ends of the middle section 52 having a predetermined diameter D1 and the inner wall of the supporting member 70 are arranged with a second thrust gap 42, which is larger than the first thrust gap 41, therebetween. Consequently, both the corner parts 52*t* of the middle section 52 on its both end sides are not in contact with the supporting wall part 75, which is an inner wall.

The contact part 55 constitutes a minor diameter part 56 having a diameter D2 which is smaller than the diameter D1, and the minor diameter part 56 including the contact part 55 is not in sliding contact with a sliding contact surface 72 of the supporting member 70. In other words, the minor diameter part 56 does not have such a contact part 55 that is in contact with the supporting wall part 75 with the diameter of the contact part 55 kept at D1, which is the diameter of the middle section 52.

Both end sides of the roller are the contact parts that are in contact with the inner wall of the supporting member which supports a thrust direction of the roller, and the roller includes the contact part having a smaller diameter than the middle section.

As a result, a diameter range of the contact part 55 in contact with the supporting wall part 75 is smaller than the diameter of the middle section 52, and accordingly increase of a peripheral speed of the contact part 55 with respect to the supporting wall part 75 to an excessive peripheral speed is inhibited, compared to when both end sides of the roller 50 are in contact with the supporting wall part 75 with their diameter kept at a diameter of the middle section of the roller. Therefore, in the roller 50 whose diameter is expanded as a countermeasure against high pressurization, seizure due to an excessive peripheral speed of such a roller at its end portion or end face is hindered.

In the first embodiment, the contact part 55 constitutes the minor diameter part 56 extending from the middle section 52 of the roller 50 in the direction of the shaft center. The contact part 55 which constitutes such a minor diameter part 56 is disposed reliably on the shaft center. Because the contact part 55 has a smaller diameter than the middle section 52, a contact area of the contact part 55 with the supporting wall part 75 may become comparatively small. Nevertheless, even in such a case, since the contact part 55 is arranged on the shaft center, contact of the contact part 55 with the supporting wall part 75 in a manner of line contact is curbed. Accordingly, excessive increase in the contact pressure is prevented.

The supporting member 70 is formed in a general cylindrical shape and supported by the supporting hole 15 of the pump housing 10 to be movable in the supporting hole 15 in the axial direction. The supporting member 70 includes a supporting main body part 71 having the sliding contact surface 72, and the supporting wall part 75 having a cylindrical shape with the supporting main body part 71 arranged inside the wall part 75.

The supporting main body part 71 includes an end face with which the lower seat 33 connected to the end portion 32 of the plunger 30 is in abutment, i.e., an end face 73 supporting the plunger 30 on its end portion side on the opposite side from an end portion of the main body part 71 having the sliding contact surface 72 in a direction perpendicular to the drive shaft 12 (vertical direction in FIG. 1 and FIG. 2A).

In the above described present embodiment, as shown in FIG. 2A, the reaction force of fuel pressure caused by pressurizing operation of the plunger 30 is applied on the outer circumferential surface 51*a* of the middle section 52 of the roller 50 of the tappet as well as on the sliding contact surface 72 of the supporting main body part 71 of the tappet which engages the outer circumferential surface 51*a*.

In other words, a pressure receiving area of the roller 50 and the supporting member 70 is determined by the middle section 52 of the roller 50 excluding both end sides of the roller 50. More specifically, the pressure receiving area is determined by a product of the diameter D1 of the roller 50 and an axial length of the middle section 52 as a ‘pressure receiving width’, and the increase in the pressure receiving area is achieved effectively by the axial length of the middle section 52, compared to the conventional technology.

Accordingly, the face pressure reduction is achieved effectively by such an increase in the pressure receiving area.

According to the invention, the tappet includes the roller and the supporting member, and the roller is supported as a result of the supporting member being in direct sliding contact with the roller on its sliding contact surface formed at its end portion on the opposite side from the end face of the supporting member which supports the plunger. Accordingly, the reaction force due to fuel pressure caused by pressurizing operation of the plunger is received by the middle section of the roller and the sliding contact surface of the supporting member. In other words, a pressure receiving area of the roller and the supporting member is defined by the sliding contact surface in contact with the middle section of the roller except its both end sides. Consequently, expansion of the pressure receiving area is effectively achieved, so that the face pressure reduction is achieved effectively.

Figure 6A:
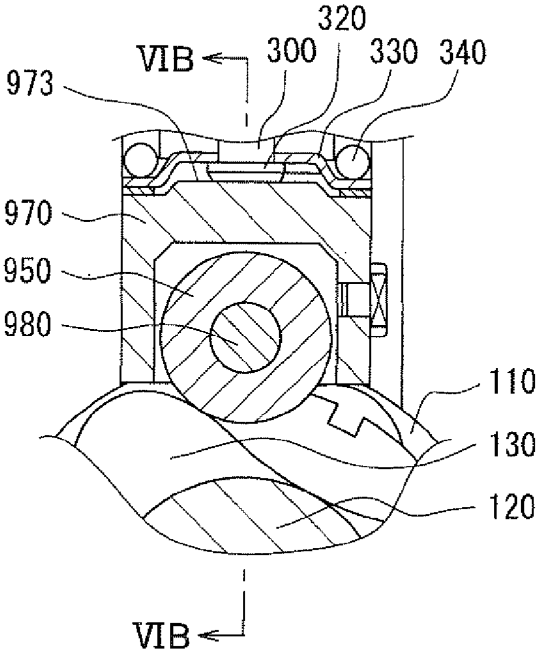
FIG. 6A PRIOR ART
FIG. 6A is a sectional view illustrating a previously proposed tappet.
Figure 6B:
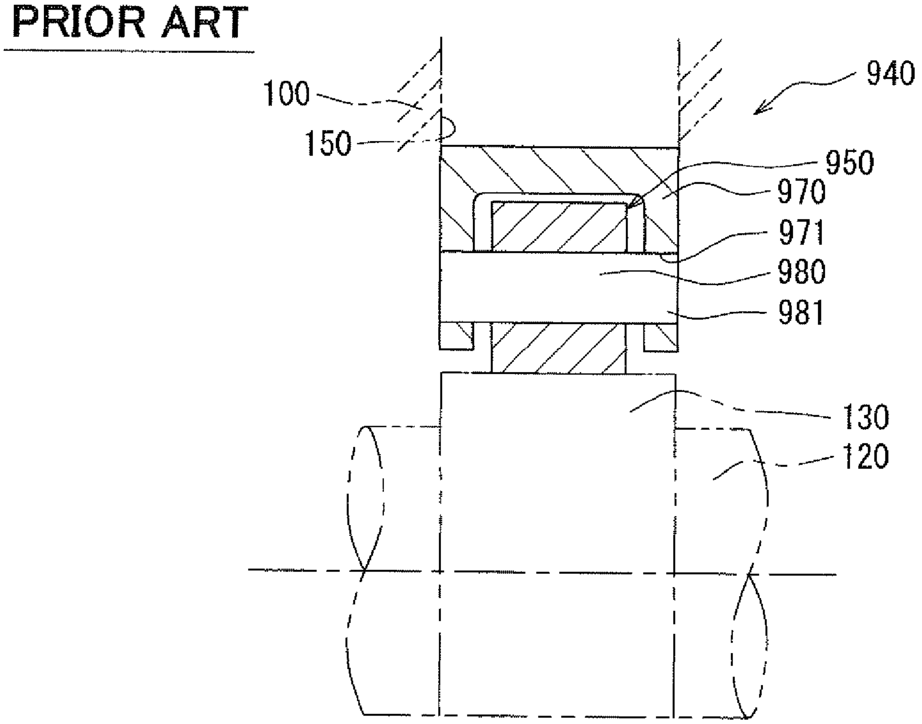
FIG. 6B PRIOR ART
FIG. 6B is a sectional view illustrating the previously proposed tappet taken along a line VIB-VIB in FIG. 6A.

In the conventional technology, as shown in FIG. 6A and FIG. 6B as an example, a tappet 940 includes a roller 950 which is in contact with a cam 130, a supporting member 970 which rotatably accommodates the roller 950 which has an end face 973 and which supports an end portion 320 of a plunger 300, and a roller pin 980 whose shaft is rotatably supported by the supporting member 970 and which slides relatively with respect to the roller 950 so as to serve as a rotation axis. The tappet 940 having such a structure does no more than receive the reaction force at an axial end part 981 of the roller pin 980 and a side wall portion 971 of the supporting member 970. This is because, since a diameter of the roller pin 980 is equal to or smaller than a diameter of the roller 950, a 'pressure receiving width', among a diameter and bearing width which determine the pressure receiving area, is limited to a sliding contact length of the axial end part 981 and the side wall portion 971 of the supporting member 970 in the axial direction.

Figure 5A:
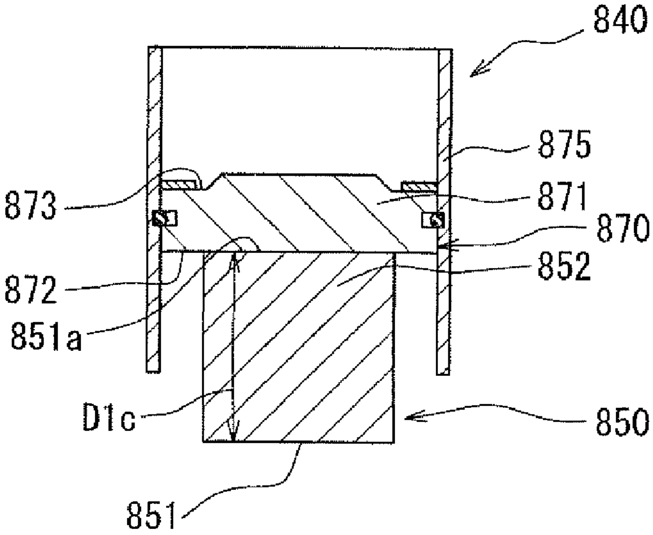
FIG. 5A RELATED ART
FIG. 5A is a sectional view illustrating a tappet in accordance with a comparative example.
Figure 5B:
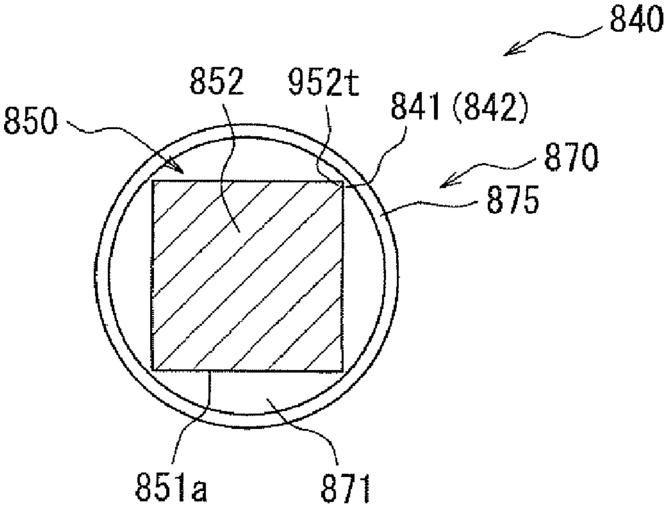
FIG. 5B RELATED ART
FIG. 5B is a plan view illustrating the tappet in FIG. 5A viewed from its lower side.

In the present embodiment, it is not a disadvantage that "the minor diameter part 56 corresponding to the both end sides of the roller 50 with respect to the entire axial length of the roller 50 does not serve as the pressure receiving area". More specifically, when a comparison is made between a comparative example shown in FIG. 5A and FIG. 5B and the first embodiment (see FIG. 2A and FIG. 2B), both the roller 50 and the roller 850 are in sliding contact directly with the sliding contact surfaces 72, 872 of the supporting members 70, 870. In the comparative example, as opposed to a principle in the present embodiment that "the roller 50 is composed of two components of the middle section 52 having the diameter D1 that excludes its both sides from the roller 50, and the contact part 55", a corner part 952*t* is formed at both ends of the middle section 852, as a result, with the roller 850 having a diameter D1*c* of a middle section 852. In this case, a clearance such as a second thrust gap 842 or a first thrust gap 841 is needed in order to avoid constant abutment between the corner part 952*t* and an inner wall of the supporting member 870, i.e., a supporting wall part 875. In other words, despite the fact that bearing widths corresponding to the axial lengths of the middle sections 52, 852 are substantially the same in the comparative example and the present embodiment, because a peripheral speed is increased due to the corner part 952*t* formed at both ends of the roller 850 so as to have the diameter D1*c*, and a contact state easily enters into a state of line contact in the comparative example, "an effect of constraining seizure as a result of the contact of the roller 50 with the supporting wall part 75 of the supporting member 70 as in the present embodiment is not produced".

Since the tappet 40 in the present embodiment is structured such that the roller 50 is supported by the inner wall of the supporting member 70 (supporting wall part 75), the generation of force in the thrust direction applied to the roller 50 is limited.

A factor in the generation of the force in the thrust direction applied to the roller 50 is that the contact between the roller and the cam may possibly be misaligned due to the variation in alignment between the roller 50 on the tappet 40 side and the cam 13 on the drive shaft 12 side. In the present embodiment, even if the thrust direction force should be applied to the roller 50, the roller 50 is supported inside the supporting member 70. Accordingly, the roller 50 does not collide with the inner circumferential surface of the supporting hole 15 which supports the tappet 40. Because the supporting member includes the inner wall which supports a thrust direction of the roller and which is in abutment with both end sides of the roller, the roller does not collide with the inner circumferential surface of the supporting hole formed in the housing even if the thrust direction force is applied to the roller. Therefore, surface roughness on the supporting hole 15 due to the collision of the roller 50 is prevented, so that inclination of the tappet 40 with respect to the supporting hole 15 is hampered. For this reason, the generation of thrust direction force because of the alignment failure of the roller 50 of the tappet 40 and the cam 13 is limited.

When a sectional shape of the supporting member 70 is cylindrical, the end portion or the corner part of the end face of the roller 50 is easily brought into abutment with the supporting wall part 75 which is such a cylindrical inner wall, so that the generation of seizure may be easily caused. However, in the first embodiment, because a state of line contact such as the contact at a corner part is avoided, the restriction of seizure is effectively achieved.

In order to effectively use the pressure receiving area of the middle section 52 of the roller 50, a range of the sliding contact surface 72 in the supporting member 70 needs to be a sliding contact surface of a semicircle or larger in its cross-section. In view of such a combination of the supporting member 70 and the roller 50, it is difficult to attach the roller 50 directly to the supporting member 70. Accordingly, the supporting member 70 may be divided between the components of the supporting main body part 71 with the sliding contact surface 72 having a sectional shape of a semicircle or larger, and the supporting wall part 75 formed in a cylindrical shape. In such a case, the following procedures are generally used. That is the support structure part 71 is press-fitted and fixed into the supporting wall part 75 after the roller 50 is incorporated from the side along the sliding contact surface 72 of the supporting main body part 71. In the case of such an attachment method, in press-fitting the supporting main body part 71 into the supporting wall part 75, deformation that the outer circumference of the supporting wall part 75 swells radially outward may be produced, so that an inclination of the tappet 40 with respect to the supporting hole 15 may be caused.

In the present embodiment, in process of the attachment in which the supporting main body part 71 is attached to the inside of the supporting wall part 75, by inserting the roller 50 and the supporting main body part 71 into the supporting wall part 75, they are integrally assembled together without press-fitting. More specifically, a locking part 49 which is a snap ring such as a C ring for catching the supporting wall part 75 and the supporting main body part 71 at such a position that the roller 50 is exposed from an opening of the supporting wall part 75 (hereinafter referred to as a target fixed position) is provided. Consequently, the deformation of the outer circumference of the supporting wall part 75 produced by the press fitting is alleviated.

Furthermore, a snap ring such as a C ring is used as the locking part 49. Accordingly, the supporting wall part 75 and the supporting main body part 71 are inserted into each other in a loosely-fitted manner, and the supporting wall part and the supporting main body part are easily caught on the locking part so as to be positioned at the target fixed position. Therefore, a body in which the roller 50, the supporting main body part 71, and the supporting wall part 75 are integrally assembled is formed using a comparatively simple constitution, and the fuel supply pump 1 having excellent productivity is achieved.

In the present embodiment that has been described above, the fuel supply pump 1 that achieves a good balance between reduction in face pressure as a countermeasure against high pressurization of injection pressure, and prevention of seizure at the end portion and end face of the roller 50 even if acting force such as the thrust direction force, which is different from a direction of linear motion, is applied to the roller 50 is achieved.

In addition, a fuel supply pump 1 according to the first embodiment may have a tappet illustrated in a modification in FIG. 3. More specifically, the fuel supply pump 1 is configured such that a communicating passage 79 which communicates between a tappet chamber 14 and a cam case 11 shown in FIG. 1 is formed in a supporting main body part 71. When the volume of the tappet chamber 14 is expanded and contracted because of a rotation-linear motion conversion function of a tappet 40, fuel with which to fill the tappet chamber 14 is transferred into the cam case 11 through the communicating passage 79. Using such a flow of fuel, fuel is efficiently introduced as lubricant into a clearance (hereinafter referred to as a slide clearance) between a sliding contact surface 72 of the supporting main body part 71 and an outer circumferential surface 51*a* of a roller 50.

Second Embodiment

Figure 4A:
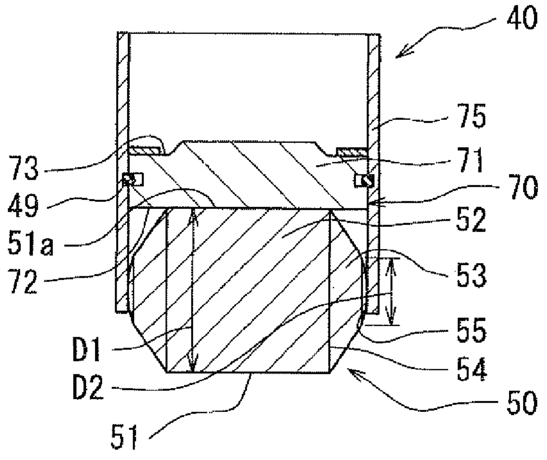
FIG. 4A is a sectional view illustrating a tappet according to a second embodiment of the invention.
Figure 4B:
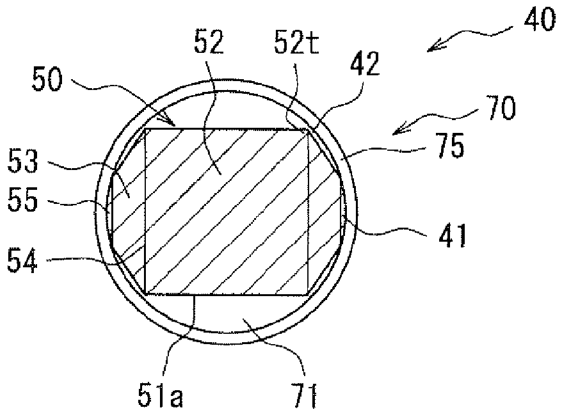
FIG. 4B is a plan view illustrating the tappet in FIG. 4A viewed from its lower side.

A second embodiment of the invention is illustrated in FIG. 4A and FIG. 4B. The second embodiment is a modification of the first embodiment. An example, in which a tapered part 53 is formed between a middle section 52 and a contact part 55 in a roller 50, is shown in the second embodiment.

As shown in FIG. 4A and FIG. 4B, the contact part 55 has a smaller diameter 92 than a diameter D1 of the middle section 52, and the tapered part 53 which continuously connects the middle section 52 and the smaller diameter D2 is formed between the middle section 52 and the contact part 55 in the roller 50.

In other words, since the tapered part 53, which continuously connects the middle section 52 and the smaller diameter D2, serves as a component between the middle section 52 and the contact part 55 in the roller 50, a corner part 54 which connects the middle section 52 and the tapered part 53 is formed to have an obtuse angle. Thus, the corner part 54 is shaped such that generation of a burr and the like or a rising edge is not easily formed. Accordingly, at the corner part 54 at both ends of an outer circumferential surface 51*a* of the middle section 52, a face pressure between the outer circumferential surface 51*a* of the roller 50 and a sliding contact surface 72 of a supporting member 70 is prevented from locally rising.

As a result, a possibility of the generation of a burr and a possibility of the local rise of face pressure between the roller 50 and the supporting member 70 at the corner part which is a rising edge are reduced. Therefore, the increase in the pressure receiving area is effectively achieved at the middle section 52 of the roller 50, as a countermeasure against high pressurization of injection pressure, and an effect of the reduction in face pressure produced by the increase in the pressure receiving area is realized evenly.

Other Embodiments

The embodiments of the invention are described above. Nevertheless, the invention is not interpreted by limiting itself to these embodiments, and may be applied to various embodiments without departing from the scope of the invention.

(1) For example, in the embodiments described above, a sectional shape of the tappet is described as cylindrical. Alternatively, the sectional shape is not limited to this and may be any shape as long as the sectional shape of the tappet is cylindrical, such as an elliptically cylindrical shape.

(2) Regarding the embodiments described above, in the first embodiment, the contact part 55 constitutes the minor diameter part 56 extending from the middle section 52 of the roller 50 in the direction of the shaft center, and in the second embodiment, the contact part 55 constitutes the tapered part 53 which continuously connects the middle section 52 and the smaller diameter in the roller 50. Alternatively, the contact part 55 and the middle section 52 may have any constitution as long as a portion of the roller 50 between the middle section 52 and the contact part 55 serves as a non-contact part which is not in contact with the supporting wall part 75 as an inner wall of the supporting member 70.

By employing any of such constitutions, the contact of the end portion or end face of the roller 50, whose diameter is left expanded, with the supporting wall part 75 of the supporting member 70 which supports the roller 50 in the thrust direction is reliably hindered. Accordingly, seizure of the end portion or end face of the roller 50 and the inner wall is effectively prevented.

Additional advantages and modifications will readily occur to those skilled in the art. The invention in its broader terms is therefore not limited to the specific details, representative apparatus, and illustrative examples shown and described.

What is claimed is:

1. A fuel supply pump for supplying high-pressure fuel to an internal combustion engine, the pump comprising:

a housing having a cam case and a pressurizing chamber into which fuel is drawn;

a drive shaft accommodated in the cam case;

a cam disposed in the cam case and formed on the drive shaft eccentrically with respect to the drive shaft so as to rotate together with the drive shaft;

a tappet disposed on an outer circumferential side of the cam and supported by the housing so as to be movable in a direction perpendicular to the drive shaft; and a plunger configured to reciprocate together with the tappet so as to pressurize fuel in the pressurizing chamber, so that the tappet converts rotational motion of the cam into linear motion of the plunger, wherein:

the tappet includes a roller and a cylindrical supporting member, which rotatably supports the roller from an outside thereof and supports the roller in a thrust direction thereof;

the roller is formed in a columnar shape and in sliding contact with an outer circumference of the cam;

the supporting member includes an end face which supports the plunger, a sliding contact surface at an end portion of the supporting member on an opposite side from the end face in the direction perpendicular to the drive shaft and in sliding contact with an outer circumference of the roller, and an inner wall which supports the roller in the thrust direction thereof;

the roller includes a middle section, and a contact part on both end sides of the middle section having a smaller diameter than the middle section;

the contact part is in contact with the inner wall and includes a minor diameter part extending from the middle section in a direction of a shaft center of the roller;

the middle section is in sliding contact with the sliding contact surface along a longitudinal direction of the roller;

the roller further includes a non-contact part between the middle section and the contact part;

the non-contact part is not in contact with the inner wall, and is formed as a tapered part that continuously connects the middle section and the contact part;

the housing has a supporting hole which supports the supporting member from an outside thereof so that the supporting member is movable in the supporting hole in the direction perpendicular to the drive shaft;

the supporting member further includes a supporting main body part and a supporting wall part;

the supporting main body part includes the sliding contact surface having a cross-sectional shape of a semicircle or larger;

the supporting wall part has a cylindrical shape and serves as the inner wall; and the supporting wall part and the supporting main body part are separately formed and integrally assembled such that the roller and the supporting main body part are inserted in the supporting wall part;

the pump further comprising a locking part between an inner peripheral surface of the supporting wall part and an outer peripheral surface of the supporting main body part, wherein the locking part is a snap ring configured to engage the supporting main body part with the supporting wall part such that the roller is exposed from an opening of the supporting wall part.

2. The fuel supply pump according to claim 1, wherein the snap ring is a C ring.

* * * * *